United States Patent [19]
Kish

[11] 3,819,151
[45] June 25, 1974

[54] FLEXIBLE VALVE

[76] Inventor: Charles A. Kish, 22 W. Sixth St., Bridgeport, Pa. 19405

[22] Filed: Sept. 22, 1972

[21] Appl. No.: 291,223

[52] U.S. Cl.............................. 251/342, 137/219
[51] Int. Cl............................................ F16k 31/44
[58] Field of Search..................... 251/342; 137/219

[56] References Cited
UNITED STATES PATENTS

| | | | |
|---|---|---|---|
| 2,692,751 | 10/1954 | Felver................. | 251/342 |
| 2,781,051 | 2/1957 | Hawley................ | 137/219 |
| 2,914,079 | 11/1959 | Hertrich............. | 137/219 |
| 2,964,292 | 12/1960 | Noir................... | 251/342 |
| 3,038,488 | 6/1962 | Welch et al......... | 137/219 |
| 3,534,771 | 10/1970 | Eyerdam.............. | 251/342 X |
| 3,626,959 | 12/1971 | Santomieri......... | 251/342 X |

FOREIGN PATENTS OR APPLICATIONS

| | | | |
|---|---|---|---|
| 1,074,939 | 2/1960 | Germany............ | 251/342 |
| 1,294,685 | 4/1962 | France............... | 251/342 |

*Primary Examiner*—Henry T. Klinksiek
*Attorney, Agent, or Firm*—Frederick J. Olsson

[57] ABSTRACT

A valve for controlling the flow of fluid in a line. The valve has a flexible body which when squeezed in one area moves a plunger to open the line and when squeezed in another area moves a plunger to close the line.

2 Claims, 4 Drawing Figures

PATENTED JUN 25 1974  3,819,151

FLEXIBLE VALVE

This invention relates to fluid pressure mechanisms and in particular relates to the valve structure for controlling the flow of fluid in a line.

The invention contemplates a valve comprised of a flexible body mounting an internal plunger moveable to different positions to control the flow of fluid thru the valve, the plunger being moveable to the different positions simply by squeezing the body in appropriate places.

One object of the invention is to provide a valve of the kind mentioned which is inexpensive to manufacture.

Another object of the invention is to provide a valve of the kind mentioned which is reliable and positive in operation.

Another object of the invention is to provide a valve of the kind mentioned which is so easily operated that it can be done by an incapacitated person such as a hospital patient.

Another object of the invention is to provide a valve of the kind mentioned which can be made of material medically compatible with the human body.

Other objects and various advantages of the invention will be apparent from the following description taken in conjunction with the drawings wherein.

Figure 1:
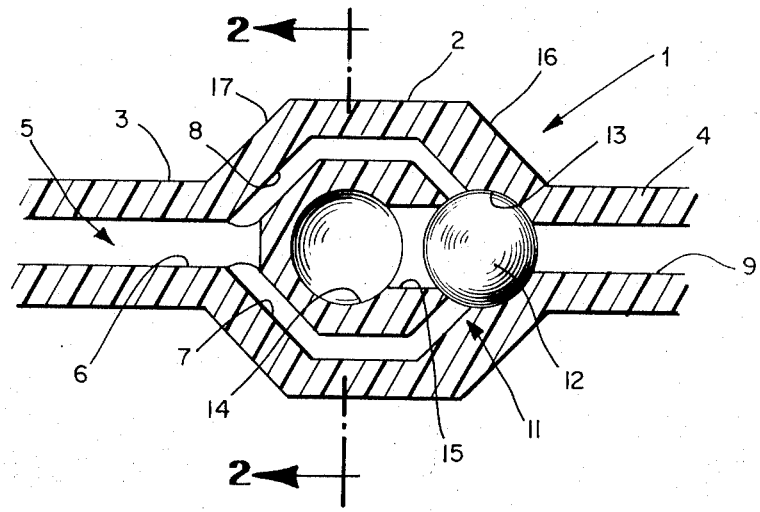
FIG. 1 is a sectional elevational view of a valve constructed in accordance with the invention.
Figure 2:
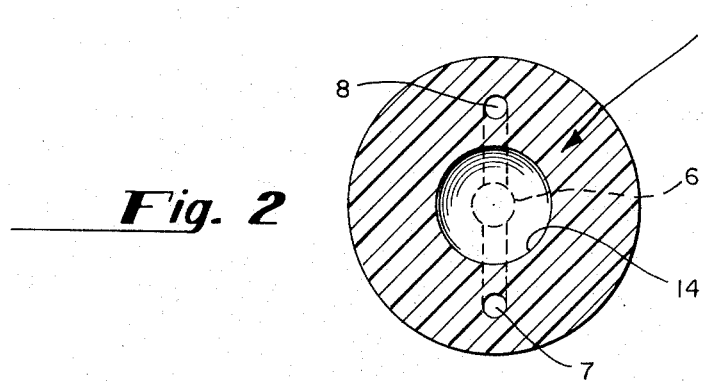
FIG. 2 is a view taken along the lines 2—2 of FIG. 1.

Referring to FIG. 1 the body of the valve 1 has an enlarged section 2 and end sections 3 and 4. Preferrably the section 3 is on the inlet side and the section 4 is the outlet side although the functions of the sections may be reversed. The body is formed with a line 5 for carrying fluids thru the body from inlet to outlet. The line comprises the parts 6, 7, 8 and 9. The parts 6 and 9 are formed in the end sections 3 and 4 while the parts 7 and 8 are formed in the enlarged section 2. A center section 11 of the body is arranged to support a fluid control plunger 12 in a cavity 13 (as shown) and in a cavity 14. When the plunger is in the cavity 13 it intersects the line 5 (parts 7–8 and 9) and thereby cuts off the flow of fluid. This is "off" position of the plunger. The cavities 13 and 14 are connected by a passage 15 thru which the plunger can be moved between the cavities. When the plunger is in the cavity 14 the line is opened. This is the "on" position of the plunger and fluid is free to flow thru the line. As shown the plunger 12 is spherical and cavities 13 and 14 are similarly configured.

The body is molded by conventional techniques from a flexible material preferrably silicone rubber. This material is preferred because of its flexibility and elasticity characteristics, its low coeffecient of friction and the fact that certain grades are available which are medically compatible with the human body. It will be understood of course that in applications requiring minimum valve cost, the body may be molded of less expensive material such as synthetic rubber.

In any event whether silicone or other rubber is used, the material should have good elastic qualities so that upon release of finger pressure (as explained below) the body will return to the normal molded state.

The plunger 12 is preferrably made from stainless steel or a hard plastic such as Nylon or Delrin.

The flexibility of the valve body and the structure of the means supporting the plunger are coordinated and cooperate to permit the plunger to be shifted from one position to another simply by squeezing on the body with the fingers.

For example, assume that the plunger 12 is in the cavity 13 with no fluids flowing thru the line 5. If the thumb and forefinger are placed on the annular slanted surface area 16 and squeezed together the body will distort and the force supplied by the fingers will be transmitted to the plunger 12. The effect of this will be to shift the plunger to the left thru the passage 15 and into the cavity 14 so that the plunger occupies the "on" position and fluids flow thru the line 5. If it is desired to shut off the valve, the thumb and forefinger are placed on the slanted annular surface area 17 and squeezed inwardly. The body distorts and the force generated by the fingers is exerted on the plunger so that the same moves thru the passage 15 into the cavity 13.

It will be understood that dimensions of the outer part of the enlarged section 2, the dimensions of the center section 11, the number of passages such as the parts 7 and 8 and the size of the passage 15 are arranged so that the plunger 12 can be conveniently snapped from one cavity to another.

Figures 3, 4:
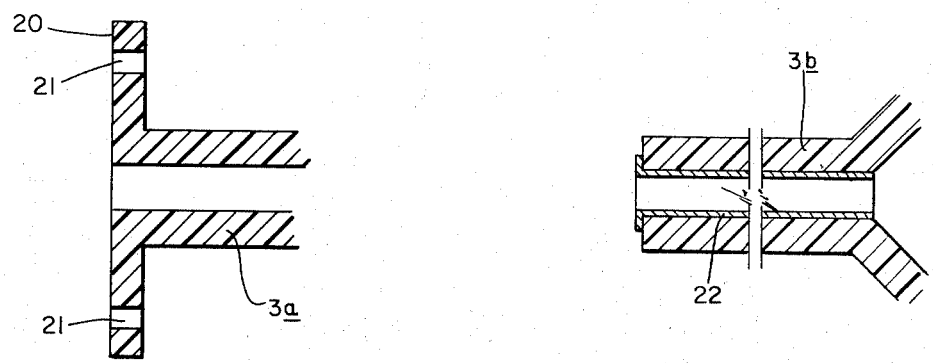
FIG. 3 is a fragmentary view of an end connection for the valve of FIG. 1.
FIG. 4 is a fragmentary elevational view of the end of the valve of the invention having a stainless steel insert.

In FIG. 3 I have shown a typical example of a means to mount the valve on some member the fluid thru which is to be controlled. Thus the section 3a of the body is molded with the annular flange 20 by which the valve can be secured. Flange 20 may be secured to the body by appropriate use of adhesive material or by means of a gasket and screws operating in the appertures 21.

In certain instances it is desirable that the sections 3 and 4 be provided with reinforcing means which will prevent the sections from moving inwardly. Thus in FIG. 4 the section 3b has a stainless steel insert 22. On the section 4 the insert is inserted into the section after molding, while an insert in section 3 may be molded in place. An insert in the section 4 does not extend into the cavity 13. This avoids interference with the seating of the plunger 12 in the cavity 13. Other reinforcing means for the end sections takes the form of a metal band adhesively secured to the periphery of the end section.

This invention contemplates a wide variety of applications for the valve. For example its inexpensive and use to use characteristics ideally suit the valve for use on inflatables such as rubber boats, rafts and the like, particularly those which are blown up by the use of lungpower. Another field of use is in the sick care area, for example in supply lines for plasma and glucose and in filter lines for kidney machines, particularly in those cases where it is desirable to make available an option in the patient to control the flow of fluid.

I claim:

1. A fluid control valve comprising:
   a body made of flexible, elastic material which will distort under manually applied force;
   the body having first means forming a fluid line for carrying fluid thru the body;

a fluid control plunger made of substantially rigid material;

the body having second means for supporting the plunger in a first cavity in an "on" position or alternatively in a second cavity in an "off" position for movement between the cavities to said positions, in the "off" position the plunger intercepting the line and blocking fluid flow thru the line and in the "on" position being spaced away from the line and permitting the flow of fluid, and the first means and the second means being constructed to provide for the line to be free from open lateral cavities in which fluid could otherwise accumulate with the plunger in the "on" position and the plunger being constructed to occupy one cavity only respectively in the "on" and "off" positions; and the body providing for the plunger to be moved between positions by force applied to the body causing the body to distort and thereby transmit force to the plunger, the force applied on one area distorting the body so that the force is transmitted to the plunger to move the same from the "on" to the "off" position and the force applied on another area distorting the body so that force is transmitted to the plunger to move the same from the "off" to the "on" position and the material forming the plunger being sufficiently rigid to provide for the plunger to move as between the "on" and "off" positions upon application of said forces.

2. A fluid control valve comprising:

a body made of flexible, elastic material which will distort under manually applied force and having an enlarged mid-section and end sections on opposite sides of the mid-section;

fluid lines respectively formed in said end sections;

fluid passages formed in said mid-section to effect fluid communication with said fluid lines;

a pair of longitudinally spaced apart, spherically shaped cavities formed in said mid-section inwardly of the fluid passages in the mid-section, one cavity being open to said fluid passages and the other open to one of said fluid lines;

a spherically shaped plunger made of substantially rigid material and mounted for positioning alternatively in one cavity or the other, the plunger when in said one cavity being in an "off" position and blocking the flow of fluid between the passages and said one fluid line and the plunger when in the other cavity being in an "on" position and permitting the free flow of fluid between the passages and said one fluid line, the plunger being constructed to occupy one cavity only respectively in the "on" and "off" positions; and said body providing for the plunger to be moved by force applied to the body causing the body to distort and thereby transmit force to the plunger, the force applied in one area distorting the body so that the force is transmitted to the plunger to move the same from the "on" position to the "off" position and the force applied to another area distorting the body so that the force is transmitted to the plunger to move the same from the "off" to the "on" position and the material forming the plunger being sufficiently rigid to provide for the plunger to move as between the "on" and "off" positions upon application of said forces.

* * * * *